(12) United States Patent
Cheng et al.

(10) Patent No.: US 12,259,928 B2
(45) Date of Patent: *Mar. 25, 2025

(54) NAMED ENTITY RECOGNITION IN SEARCH QUERIES

(71) Applicant: Home Depot Product Authority, LLC, Atlanta, GA (US)

(72) Inventors: Xiang Cheng, Atlanta, GA (US); Mitchell Bowden, Irving, TX (US); Priyanka Goyal, Atlanta, GA (US); Bhushan Ramesh Bhange, Irving, TX (US)

(73) Assignee: Home Depot Product Authority, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/403,230

(22) Filed: Jan. 3, 2024

(65) Prior Publication Data

US 2024/0184830 A1    Jun. 6, 2024

Related U.S. Application Data

(63) Continuation of application No. 17/173,937, filed on Feb. 11, 2021, now Pat. No. 11,880,411.
(Continued)

(51) Int. Cl.
*G06F 16/903* (2019.01)
*G06F 16/954* (2019.01)
(Continued)

(52) U.S. Cl.
CPC ...... *G06F 16/90335* (2019.01); *G06F 16/954* (2019.01); *G06F 18/2148* (2023.01); *G06F 40/295* (2020.01); *G06N 3/045* (2023.01)

(58) Field of Classification Search
CPC ............ G06F 16/90335; G06F 16/954; G06F 18/2148; G06F 40/295; G06F 18/214; G06N 3/045; G06N 3/044; G06N 3/08
See application file for complete search history.

(56) References Cited

U.S. PATENT DOCUMENTS

2008/0130960 A1   6/2008 Yagnik
2016/0154783 A1   6/2016 Hebert
(Continued)

OTHER PUBLICATIONS

Collobert et al., 2008. A unified architecture for natural language processing: Deep neural networks with multitask learning. In Proceedings of the 25th international conference on Machine learning. 160-167.
(Continued)

*Primary Examiner* — Daniel C Washburn
*Assistant Examiner* — Athar N Pasha
(74) *Attorney, Agent, or Firm* — Greenberg Traurig, LLP

(57) ABSTRACT

Named Entity Recognition (NER) in a user search query in a real-time search engine may be achieved by training a machine learning algorithm to create a trained model. The trained model may be configured to receive a user search query as input and to recognize and output zero or more named entities in the search query. The training may include an iterative training process in which further training data is added at each iteration, in some embodiments. The training may be based on three training data sets, in some embodiments. A first training data set may be based on user search and engagement activity. A second training data set may be artificially generated based on a catalog of named entity values. A third training data set may be based on optimized and supplemented data pairs sampled from the first training data set.

17 Claims, 6 Drawing Sheets

Related U.S. Application Data

(60) Provisional application No. 62/975,538, filed on Feb. 12, 2020.

(51) Int. Cl.
    *G06F 18/214*     (2023.01)
    *G06F 40/295*     (2020.01)
    *G06N 3/045*     (2023.01)

(56) References Cited

U.S. PATENT DOCUMENTS

| | | |
|---|---|---|
| 2019/0057157 A1 | 2/2019 | Mandal |
| 2021/0082406 A1 | 3/2021 | Kim |
| 2021/0117613 A1* | 4/2021 | Galitsky ................ G06F 40/35 |
| 2021/0150383 A1 | 5/2021 | Lindström |
| 2021/0174016 A1 | 6/2021 | Fox |
| 2021/0312000 A1 | 10/2021 | Swaminathan |
| 2022/0172725 A1 | 6/2022 | Khan Khattak |

OTHER PUBLICATIONS

Collobert et al., 2011. Natural language processing (almost) from scratch. Journal of machine learning research 12, Aug. 2011, 2493-2537.

Cowan et al., 2015. Named Entity Recognition in Travel-related Search Queries. In Proceedings of the Twenty-Ninth AAAI Conference on Artificial Intelligence (AAAI'15). AAAI Press, 3935-3941.

Devlin et al., 2018. Bert: Pre-training of deep bidirectional transformers for language understanding. arXiv preprint arXiv:1810.04805, 16 pp.

Guo et al., 2009. Named entity recognition in query. In Proceedings of the 32nd international ACM SIGIR conference on Research and development in information retrieval. ACM, 267-274.

Huang et al., 2015. Bidirectional LSTM-CRF models for sequence tagging. arXiv preprint arXiv:1508.01991, 10 pp.

IAAI-21 Program, AAAI 2021 Conference, Thirty-Third Annual Conference on Innovative Applications of Artificial Intelligence (IAAI-21), https://aaai.org/Conferences/AAAI-21/iaai-21-program/, Dated Feb. 11, 2021, 9 pgs.

Lample et al. "Neural architectures for named entity recognition." arXiv preprint arXiv:1603.01360 (2016), 11 pp.

Lee, LSTM-CRF models for named entity recognition. IEICE Transactions on Information and Systems 100, 4 (2017), 882-887.

Liu et al., "GCDT: A global context enhanced deep transition architecture for sequence labeling." arXiv preprint arXiv:1906.02437 (2019), 11 pp.

Ma et al., End-to-end sequence labeling via bidirectional lstm-cnns-crf. arXiv preprint arXiv:1603.01354 (2016), 11 pp.

Majumder et al., 2018. Deep Recurrent Neural Networks for Product Attribute Extraction in ECommerce. arXiv preprint ArXiv:1803.11284, 7 pp.

Mikolov et al., Efficient estimation of word representations in vector space. arXiv preprint arXiv:1301.3781 (2013), 12 pp.

More, "Attribute extraction from product titles in ecommerce." arXiv preprint arXiv:1608.04670 (2016), 10 pp.

Nadeau et al., A survey of named entity recognition and classification. Lingvisticæ Investigationes 30, 1 (2007), 3-26. https://doi.org/10.1075/li.30.1.03nad, 20 pp.

Papers With Code. 2020. Papers With Code—Named Entity Recognition. https://paperswithcode.com/task/named-entity-recognition-ner, 17 pp.

Pennington et al., "Glove: Global vectors for word representation." Proceedings of the 2014 conference on empirical methods in natural language processing (EMNLP). 2014, 12 pp.

Peters et al., Deep contextualized word representations. Proceedings of NAACL-HLT 2018, pp. 2227-2237 New Orleans, Louisiana, Jun. 1- 6, 2018.

Putthividhya et al., "Bootstrapped named entity recognition for product attribute extraction." Proceedings of the 2011 Conference on Empirical Methods in Natural Language Processing. 2011, 11 pp.

Sang et al., "Introduction to the CoNLL-2003 shared task: Language-independent named entity recognition." arXiv preprint cs/0306050 (2003), 6 pp.

Vaswani et al., "Attention is all you need." Advances in neural information processing systems 30 (2017), 11 pp.

Wen et al., 2019. Building Large-Scale Deep Learning System for Entity Recognition in E-Commerce Search. In Proceedings of the 6th IEEE/ACM International Conference on Big Data Computing, Applications and Technologies. 149-154.

Wu et al., "Predicting latent structured intents from shopping queries." Proceedings of the 26th International Conference on World Wide Web. 2017, 9 pp.

Yadav et al., "A survey on recent advances in named entity recognition from deep learning models." arXiv preprint arXiv:1910.11470 (2019), 14 pp.

\* cited by examiner

NAMED ENTITY RECOGNITION IN SEARCH QUERIES

CROSS-REFERENCE TO RELATED APPLICATION

This application claims priority to provisional application No. 62/975,538, filed on Feb. 12, 2020, which is hereby incorporated by reference in its entirety.

TECHNICAL FIELD

This disclosure relates to named entity recognition in search queries and other internet or electronic interface queries.

BACKGROUND

One challenge in understanding user queries on electronic interfaces, such as search queries in a search engine or website, is recognition of specifically-named entities that the user intends to identify. Named Entity Recognition (NER) is a common information retrieval task to locate, segment, and categorize a pre-defined set of entities from unstructured text such as person names, place names, business names, dates, times, and measurements.

SUMMARY

In a first aspect of the present disclosure, a method for responding to a search query is disclosed. The method includes defining a machine learning algorithm, the algorithm configured to receive a user query as input and to output zero or more named entities of one or more entity types in the user query, each of the one or more entity types comprising a respective plurality of values. The method further includes defining a first data set according to user behavior data, the first data set comprising a plurality of first data pairs, each data pair comprising a user search query and a one or more defined named entity values in the user search query. The method further includes defining a second data set by creating a plurality of artificial second data pairs, each second data pair comprising an artificial search query and one or more defined named entity values in the artificial search query. The method further includes training the machine learning algorithm to create a trained model by: (i) defining an initial training data set comprising a portion of the first data set; (ii) training the algorithm according to the training data set; (iii) adding further data from the first data set and the second data set to the training data set to create a further training data set; (iv) training the algorithm according to the further training data set; and (v) iteratively repeating (iii) and (iv). The method further includes receiving a user search query, recognizing one or more named entity values in the search query with the trained model, and outputting a response to the user according to the one or more recognized named entity values.

In an embodiment of the first aspect, defining the initial training data set includes determining a plurality of named entity values in the user search queries of the first data set that are not in the associated defined named entity values of the first data set and the portion of the second data set, and adding the determined plurality of named entity values to the defined named entity values of the first data set.

In an embodiment of the first aspect, outputting a response to the user according to the one or more recognized named entity values includes directing the user to a webpage dedicated to one of the one or more recognized named entity values, filtering a set of search results according to the one or more recognized named entity values and outputting the filtered search result set to the user, or displaying the one or more recognized named entity values to the user.

In an embodiment of the first aspect, iteratively repeating (iii) and (iv) comprises iteratively repeating (iii) and (iv) until an accuracy of the trained model exceeds a predetermined threshold or until a predetermined number of iterations has been performed.

In an embodiment of the first aspect, adding further data from the first data set and the second data set to the training data set includes adding data pairs for each of a plurality of entity type sequences.

In an embodiment of the first aspect, the method further includes+evaluating the trained model according to a portion of the first data set that is not in the initial training data.

In an embodiment of the first aspect, the machine learning algorithm includes a character-to-word layer and a word-to-label layer.

In an embodiment of the first aspect, the character-to-word layer comprises a bidirectional long short-term memory network, and the word-to-label layer comprises a bidirectional gated recurrent unit network.

In a second aspect of the present disclosure, a system for responding to a search query is provided. The system includes a non-transitory, computer-readable memory storing instructions and a processor configured to execute the instructions to perform a method. The method includes defining a machine learning algorithm, the algorithm configured to receive a user query as input and to output zero or more named entities of one or more entity types in the user query, each of the one or more entity types comprising a respective plurality of values. The method further includes defining a first data set according to user behavior data, the first data set comprising a plurality of first data pairs, each data pair comprising a user search query and a one or more defined named entity values in the user search query. The method further includes defining a second data set by creating a plurality of artificial second data pairs, each second data pair comprising an artificial search query and one or more defined named entity values in the artificial search query. The method further includes training the machine learning algorithm to create a trained model by: (i) defining an initial training data set comprising a portion of the first data set; (ii) training the algorithm according to the training data set; (iii) adding further data from the first data set and the second data set to the training data set to create a further training data set; (iv) training the algorithm according to the further training data set; and (v) iteratively repeating (iii) and (iv). The method further includes receiving a user search query, recognizing one or more named entity values in the search query with the trained model, and outputting a response to the user according to the one or more recognized named entity values.

In an embodiment of the second aspect, defining the initial training data set includes determining a plurality of named entity values in the user search queries of the first data set that are not in the associated defined named entity values of the first data set and the portion of the second data set, and adding the determined plurality of named entity values to the defined named entity values of the first data set.

In an embodiment of the second aspect, outputting a response to the user according to the one or more recognized named entity values includes directing the user to a webpage dedicated to one of the one or more recognized named entity values, filtering a set of search results according to the one or more recognized named entity values and outputting the filtered search result set to the user, or displaying the one or more recognized named entity values to the user.

In an embodiment of the second aspect, iteratively repeating (iii) and (iv) comprises iteratively repeating (iii) and (iv) until an accuracy of the trained model exceeds a predetermined threshold or until a predetermined number of iterations has been performed.

In an embodiment of the second aspect, adding further data from the first data set and the second data set to the training data set comprises adding data pairs for each of a plurality of entity type sequences.

In an embodiment of the second aspect, the method comprises evaluating the trained model according to a portion of the first data set that is not in the initial training data.

In an embodiment of the second aspect, the machine learning algorithm includes a character-to-word layer and a word-to-label layer.

In an embodiment of the second aspect, the character-to-word layer includes a bidirectional long short-term memory network, and the word-to-label layer includes a bidirectional gated recurrent unit network.

In a third aspect of the present disclosure, a method for training a machine learning algorithm to create a trained model, the trained model for recognizing one or more named entities in a user search query, the one or more named entities having one or more entity types, is provided. The method includes defining a first data set according to user behavior data, the first data set comprising a plurality of first data pairs, each first data pair comprising a user search query and one or more defined named entity values in the user search query. The method further includes determining a plurality of named entity values in the user search queries of the first data set that are not in the associated defined named entity values of the first data set and adding the determined plurality of named entity values to the defined named entity values of the first data set to create a supplemented first data set. The method further includes defining a second data set by creating a plurality of artificial second data pairs, each second data pair comprising an artificial search query and one or more defined named entity values in the artificial search query. The method further includes training the machine learning algorithm to create a trained model by: (i) defining an initial training data set comprising a portion of the supplemented first training data set; (ii) training the algorithm according to the supplemented first training data set; (iii) adding further data from the supplemented first training data set and from the second data set to the initial training data set to create a further training data set; (iv) training the algorithm according to the further training data set; and (v) iteratively repeating (iii) and (iv) until an accuracy of the trained model exceeds a predetermined threshold or until a predetermined number of iterations has been performed.

In an embodiment of the third aspect, adding further data from the first data set and the second data set to the training data set comprises adding data pairs for each of a plurality of entity type sequences.

In an embodiment of the third aspect, the method further includes evaluating the trained model according to a portion of the first data set that is not in the initial training data.

In an embodiment of the third aspect, the model is for recognizing one or more named entities selected from a predetermined set of named entity values.

DETAILED DESCRIPTION

Figure 1:
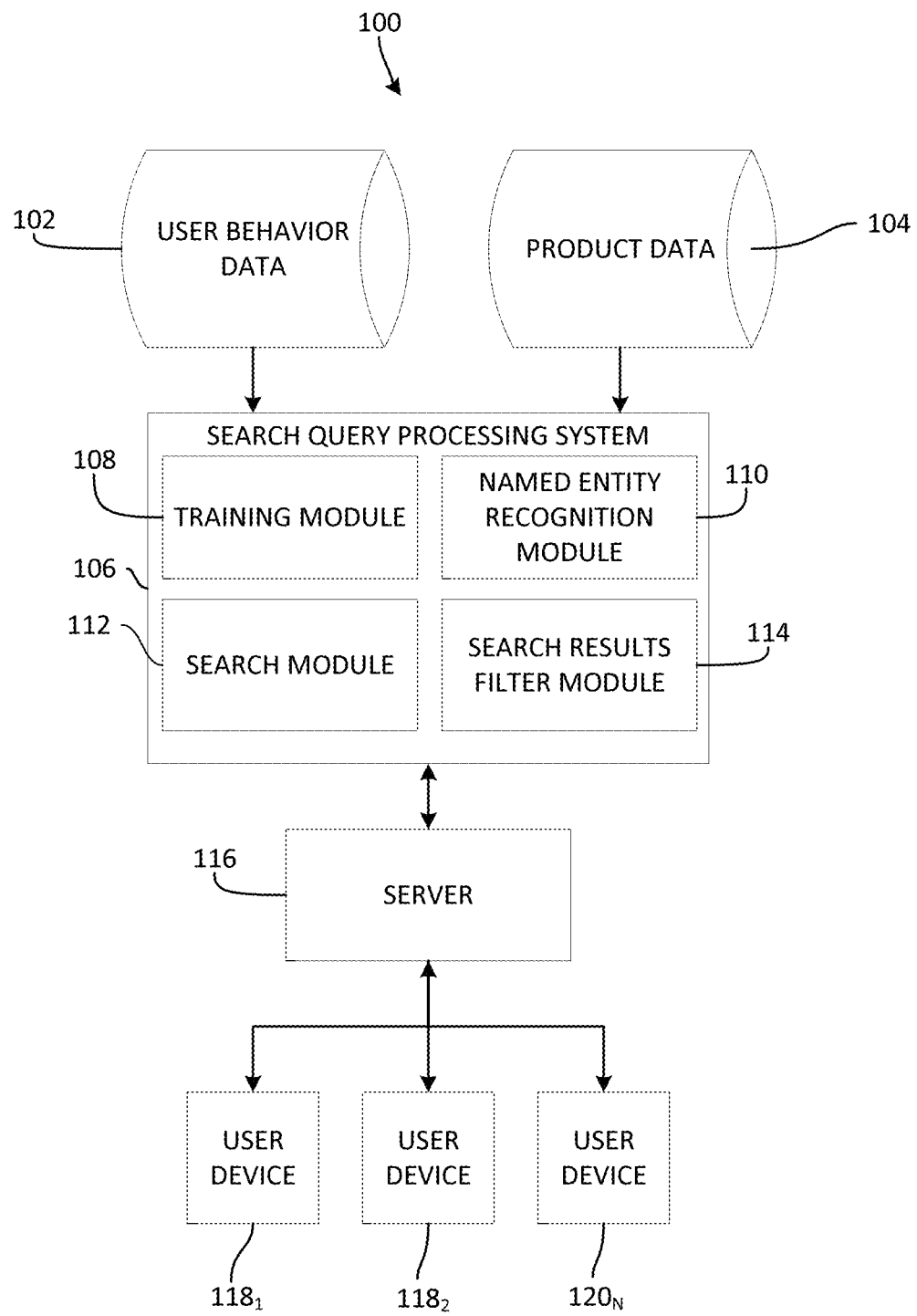
FIG. 1 is a diagrammatic view of an example system for recognizing names entities in a search query and returning a result to the query.

A search engine associated with an electronic user interface, such as an e-commerce website or other website website, may process millions, billions, or more search queries per year. A fundamental challenge for a search engine is to understand a search query and extract attributes in it to help identify the primary search target and retrieve the most appropriate search results. This task can be framed as named entity recognition (NER), which is an information retrieval task to locate, segment, and categorize a predefined set of entities from unstructured text. Although research on NER has advanced since the early 1990s, feasible industrial applications have generally not been found. The focus of existing research systems is often marginal improvement of F1 scores without regard for use at the scale of a search engine that processes a large search volume.

Several challenges exist in known NER approaches that the instant disclosure improves upon: (1) Industrial applications benefit from custom, domain-specific knowledge and training data, covering the full extent of entities of different types, including representative examples of noisy queries (spelling errors, abbreviations, etc.) and noisy user intent signals, such as from conversion (purchase) events on an e-commerce website. (2) Deep learning models usually require a large amount of high-quality training data, which is often expensive, time-consuming, and sometimes impossible to acquire. (3) Integration of NER recognition with an existing system often takes significant effort because NER is usually not the end of the application, and may require careful design and implementation to have a real-world impact. (4) Deployment is challenging as deep learning models are computationally expensive to train and execute in a real-time application such as an e-commerce search engine.

This disclosure will make reference to entity types in the context of an e-commerce website. Such entity types may be, for example, brands, product types, categories, quantities, product attributes, and others. It should be understood, however, that the teachings of the present disclosure are also applicable to named entity recognition in contexts other than e-commerce, and therefore also to entity types other than those listed above.

NER recognition based only on a greedy comparison of known entity values to a search query does not offer an optimal solution. For example, queries containing multiple product types or multiple brands but only one target, ambiguity between product types and brands, or new product types not in a pre-defined taxonomy may result in incorrectly identified named entities. Three examples are listed in Table 1 below demonstrate such challenges. A named entity recognition system according to the present disclosure is more capable of addressing these problems.

TABLE 1

| Query | NER brand | NER product type | True brand | True product type |
|---|---|---|---|---|
| weed eater light weight | weed eater | light | | weed eater |
| fridge no ice maker | | ice maker | | fridge |
| cosco table and chair set | cosco | table | cosco | table and chair set |

Known methods of recognizing named entities in user search queries are either inaccurate or not fast enough for deployment in a real-time search context, such as an e-commerce website or other website. The instant disclosure improves upon known methods by providing robust, computationally-efficient named entity recognition (NER) for a website search engine.

The instant disclosure may improve on known NER approaches by training a machine learning algorithm to create a trained model. The trained model may be configured to receive a user search query as input and to recognize and output zero or more named entities in the search query. The training may include an iterative training process in which further training data is added at each iteration, in some embodiments. The training may be based on three training data sets, in some embodiments.

One or more different machine learning algorithms may find use with the present disclosure. For example, in some embodiments, a bidirectional recurrent neural network with conditional random fields (RNN-CRF) may be employed. Still further, in some embodiments, the RNN-CRF may be or may include a bidirectional long short-term memory (BiLSTM-CRF) with pretrained word embeddings, character embeddings, and dropout may be employed. Still further, a gated recurrent unit (GRU) network, a simplified variant of the LSTM, may be employed.

Referring now to the drawings, wherein like numerals refer to the same or similar features in the various views, FIG. 1 is a diagrammatic view of an example system 100 for search query processing including named entity recognition. The system 100 may receive and respond to search queries from users of an electronic interface (such as an e-commerce website or other website).

The system 100 may include a database 102 of user behavior data, a database 104 of product data, and a search query processing system 106 that may include one or more functional modules 108, 110, 112, 114 embodied in hardware and/or software. In an embodiment, the functional modules 108, 110, 112, 114 of the search query processing system 106 may be embodied in a processor and a memory storing instructions that, when executed by the processor, cause the processor to perform the functionality of one or more of the functional modules and/or other functionality of this disclosure.

The functional modules 108, 110, 112, 114 of the search query processing system 106 may include a training module 108 that is configured to train one or more machine learning models using data obtained from the databases 102, 104 or another store of training data. The training module 108 may define a plurality of sets of training data, in some embodiments. The training module 108 may be configured to train one or more machine learning models using the training data. The trained machine learning model(s) may be configured to, given an input of user search query, output one or more named entities recognized in the search query. In some embodiments in which the system 100 is deployed in support of an e-commerce website or platform, the training module 108 may train the one or more machine learning models to recognize one or more brand names and/or one or more product types. The training module 108 may be configured to train a machine learning algorithm to create a trained model that recognizes one or more named entities, where the one or more named entities are from a predetermined list.

A named entity recognition module 110 may include the machine learning model(s) trained by the training module 108, or a portion of the model(s), in some embodiments. The named entity recognition module 110 may be configured to accept a user search query as input and to output one or more named entities recognized in the search query. In some embodiments in which the system 100 is deployed in support of an e-commerce website or platform, the NER module 108 may be configured to recognize one or more brand names and/or one or more product types. The named entities recognized by the named entity recognition module 110 may be selected from a predetermined list.

The search query processing system 106 may further include a search module 112 and a search results filter module 114. The search module 112 may be configured to search a set of documents for documents relevant to a user search query and output a set of documents relevant to the query, and the search results filter module 114 may be configured to apply one or more automatic or user-selected filters to the output of the search module 112. In some embodiments, the function of the search module 112 and/or the search result filter module 114 may be according to the output of the NER module 110.

The system 100 may further include a server 116 in electronic communication with the search query processing system 106 and with a plurality of user computing devices $118_1, 118_2, \ldots 118_N$. The server 116 may provide a website, data for a mobile application, or other interface through which the users of the user computing devices 118 may view products having data in the product data database 104 and through which the users may place search queries. For example, the server 118 may provide an e-commerce website of a retailer that includes listings for one or more products. In some embodiments, the server 118 may receive a search query from a user, provide the search query to the search query processing system 106, receive a set of search results from the search query processing system 106, and provide the set of search results to the user.

Figure 2:
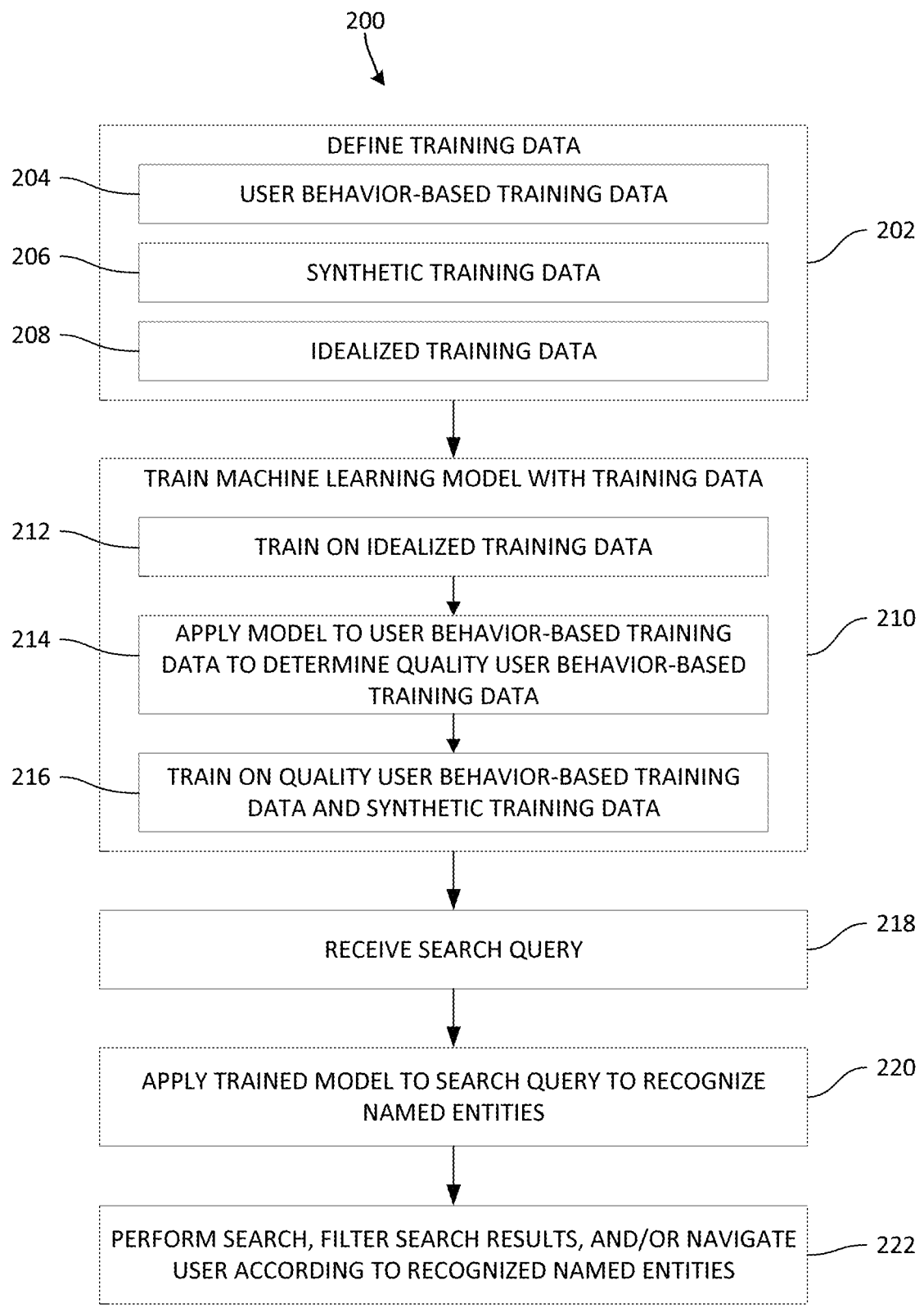
FIG. 2 is a flow chart illustrating an example method of recognizing named entities in a search query and returning a result to the query.

FIG. 2 is a flow chart illustrating an example method of recognizing named entities in a search query and returning a result to the query. Referring to FIGS. 1 and 2, the method 200, or one or more portions thereof, may be performed by the search query processing system 106.

The method 200 may include, at block 202, defining training data. In some embodiments, defining the training data may include defining one or more sets of training data. For example, defining the training data may include defining three sets of training data, in some embodiments. A first set of training data may include user behavior-based training data 204, which may include user search queries, responsive search results, and brand and product type selections of the users from those search results. Referring to FIGS. 1 and 2, the user behavior-based training data may be derived from the user behavior data 102 and the product data 104.

With continued reference to FIG. 2, a second set of training data may include synthetic training data 206. The synthetic training data 206 may include one or more data points that are absent from the user behavior-based training data 204, in some embodiments. For example, the synthetic training data may include a comprehensive set of data points that cover the data space. In a particular example, where the method 200 is implemented in support of an e-commerce website, the synthetic training data 206 may include brands and/or product types that are not represented in the user behavior-based training data 204. In some embodiments, the synthetic training data 206 may include all or a majority of the brands and/or product types that are represented or not represented in the user behavior-based training data 208.

A third set of training data may include idealized training data 208. The idealized training data 208 may be a subset of the user behavior-based training data 204 and/or the synthetic training data 206. In an embodiment, the idealized training data may be user-curated.

The method 200 may further include, at block 210, training a machine learning model with the training data. Training at block 210 may include, at sub-block 212, training the machine learning model on the idealized training data 208, or a portion thereof. Training initially on the idealized training data 208 may provide a quality first training generation.

Training at block 210 may further include, at sub-block 214, applying the model (as initially trained on the idealized training data 208) to the user behavior-based training data 204 to determine quality user behavior-based training data 204. Sub-block 214 may operate as a filter on the user behavior-based training data 204, and the resulting quality user behavior-based training data may be used for further training.

Training at block 210 may further include, at sub-block 216, continuing to train the model on the quality user behavior-based training data and on the synthetic data 206. Sub-blocks 214, 216 may be repeated until improvement in model accuracy from generation to generation falls below a predetermined threshold, or until a predetermined number of training generations has occurred. In some embodiments, after each generation of training, the model accuracy may be assessed by applying the model to a subset of the idealized training data (e.g., a subset that was not used to train the model in the first instance).

Training at block 210 may further include, in some embodiments, continuing to train the model on a combination of portions of the user behavior-based training data 204, the synthetic data 206, and the idealized training data 208. Further, training at block 210 may include selecting portions of the user behavior-based training data 204, the synthetic data 206, and the idealized training data 208 for a particular generation of training based on the performance of the model after a previous generation of training and based on the training data that was used in previous generations. For example, a current-generation model may be used as a filter to select particular data from the user behavior-based training data 204 (e.g., the quality user behavior-based training data noted above). Portions of the synthetic data 206 and the idealized training data 208 may be selected for training randomly or according to one or more statistical sampling methods.

Once trained, the model may be applied in support of a search engine to recognize named entities in user search queries. The method 200 may therefore further include, at block 218, receiving a search query from a user computing device. The search query may be made through an e-commerce website, in some embodiments. The search query may include one or more named entities, such as one or more brands or product types, to be recognized.

The method 200 may further include, at block 220, applying the trained model to the search query to recognize one or more named entities in the search query.

The method 200 may further include, at block 222, performing a search, filtering search results, and/or navigate the user according to the recognized named entities in the search query. For example, where one or more brands are recognized in the search query, block 222 may include performing a search according to the entire search query and filtering the results to limit the results to the recognized brands, or to place the recognized brands at the top of the results. In another example, where one or more product types are recognized in the search query, block 222 may include performing the search for the one or more product types. In another example, where the entire search query is a single brand or a single product type, block 222 may include navigating the user to a brand page or product page associated with the named entity. A response to the search query may be transmitted to the user, such as filtered search results, or a particular webpage or document associated with a brand or product type, as noted above, and/or through a display of the recognized named entities to the user as a search suggestion or alongside search results, as a result of block 222.

Figure 3:
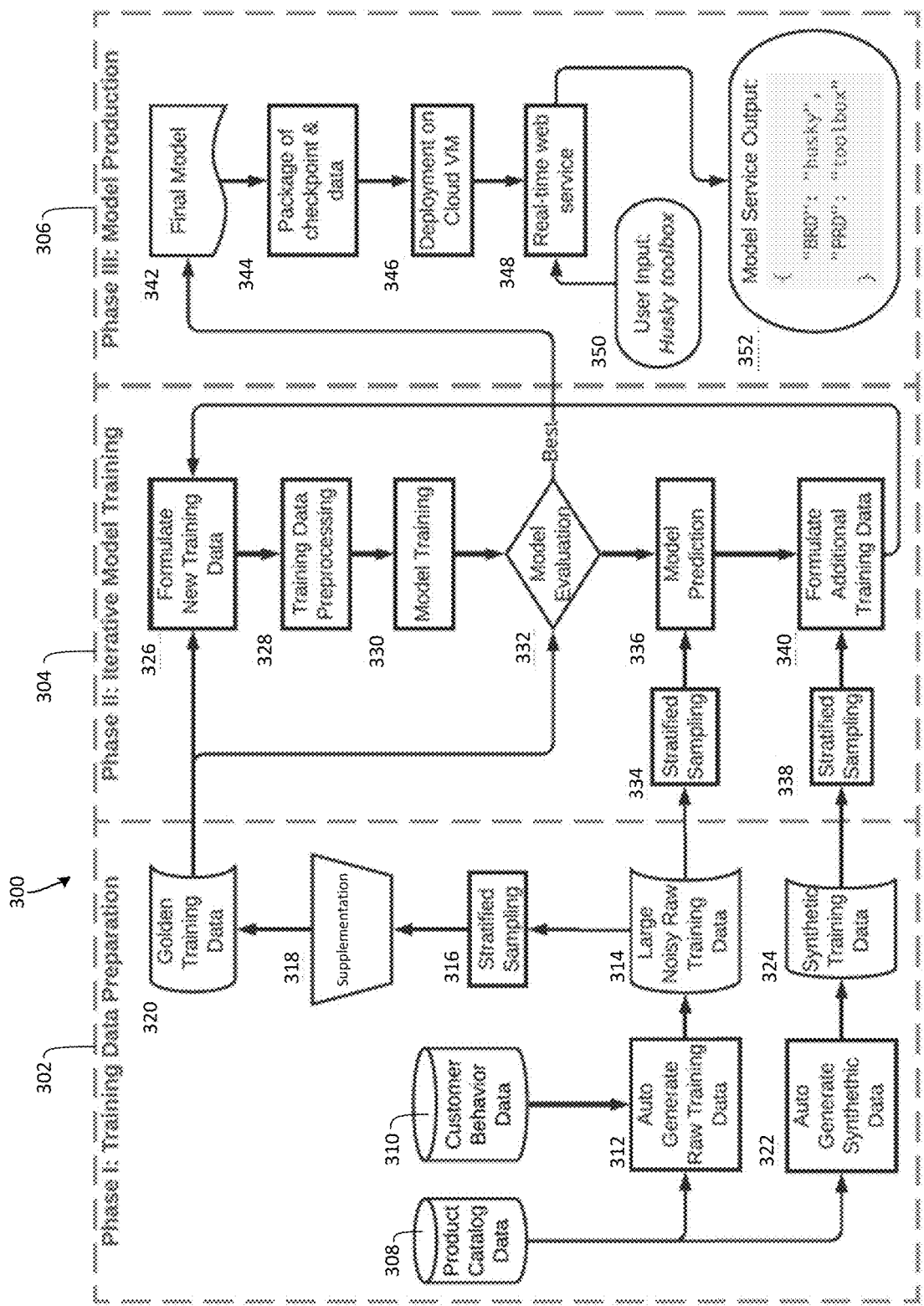
FIG. 3 is flow chart illustrating an example method of training a machine learning model for named entity recognition in a search query and deploying the trained model.

FIG. 3 is flow chart illustrating an example method 300 of training a machine learning model for named entity recognition in a search query and deploying the trained model. The method 300 may be considered a "triplelearn", a novel approach to machine learning training for named entity recognition. The method 300, or one or more portions thereof, may be performed by the search query processing system 106. The flow chart is generally illustrated in three portions: a training data preparation phase 302, an iterative model training phase 304, and a model deployment phase 306.

Phase I: Training Data Preparation 302. A desirable set of training data for a deep learning model may have three characteristics: (1) large size; (2) high quality labels; and (3) high coverage of all label values (e.g., all brands and product types in this problem). In many applications, however, it is too time-consuming and expensive to prepare a single set of training data meeting all three characteristics. Accordingly, three separate data sets may be defined, each addressing once of the above three characteristics, and the three data sets may be used collectively for training data. The first two data sets may be partially (or entirely) based on product catalog data 308 and customer behavior data 310. The product catalog data 308 may include ground truth information respective of all values of all named entity types for which the machine learning algorithm will be trained to recognize. Accordingly, in an embodiment in which the named entity types relate to products (such as brand and product type), the product catalog data 308 may include ground truth information for all available products, which includes all brands and all product types. In other embodiments, a data source including other named entity type ground truth information (i.e., other than brand and product type, or for information other than products) may be utilized. The customer behavior data 310 may include data respective of customer users' interactions with a website on which the products reflected in catalog data 308 are available, including searches, impressions, clicks, purchases, and/or other information. In other embodiments, other data respective of user activity may be included in a user behavior database.

The method may include, at block 312, applying a rule-based algorithm to the product catalog data 308 and the customer behavior data 310 that matches tokens in the product catalog data 308 to tokens in the customer behavior data 310 to automatically generate a first set of training data 314. As a result, the first training data set 314 may include a plurality of data pairs, each pair including an actual user search query or other user interaction and one or more named entities included in that search query that match a named entity from the product catalog data 308.

The method may further include, at block 316, sampling a portion of the first training data set 314 and, at block 318, supplementing the sampled data in order to prepare a supplemented data set 320, which may be considered high quality "golden" data, in some embodiments. The sampled data may be supplemented by determining one or more named entity values present in the search queries of the sampled data pairs that are not included in the named entity values of those data pairs, and adding the determined named entity values to the relevant data pairs. In other words, where a sampled data pair includes a search query having named entity values A, B, and C, but the corresponding named entity set of that data pair included only entity values A and C, block 318 may include adding entity value B to the data pair. In some embodiments, the supplementation may be manual, or may include a combination of greedy named entity recognition and manual checking or intervention. The supplemented data set 320 may be used in algorithm training and to measure the real model performance in each training iteration, in some embodiments.

To avoid bias or over-fitting the trained model on a small number of named entity sequence patterns, sampling at block 316 may include stratified sampling of the data by label pattern, such that each label pattern is sampled in relatively equal number. Here a pattern is defined as a sequence of entity types, irrespective of the individual entity values. For example, table 2 below illustrates four (of many) possible label patterns in an embodiment in which the possible named entity types are brand (BRD) and product (PRD), where "O" represents "outside", i.e., text in a query that is not a named entity.

TABLE 2

| milwaukee cheap drill |
| ge 7.4 cu ft dryer gas |
| behr paint discount |
| bronze faucet pull down |

The method may further include, at block 322, creating a second, synthetic data set 324 by applying a rule-based algorithm to the named entity types and values in the product catalog data 308 to create a plurality of artificial search queries having different combinations of those entity types and values. The second data set 324 may include a plurality of data pairs, each data pair including an artificial query and one or more named entity values present in that artificial query. In some embodiments, every entity value of every entity type may berepresented at least once in the synthetic data set 324.

Phase II: Iterative Model Training. In the model training phase 304, the machine learning algorithm may be iteratively trained to create a trained model. At each iteration, further training data may be added. The goal is to incrementally improve the model performance (F1 score).

The model training phase 304 may include defining a machine learning algorithm to be trained. The machine learning algorithm may be, for example, a BiGRU-CRF with BiLSTM character-based word representations, in an embodiment.

Figure 4A:
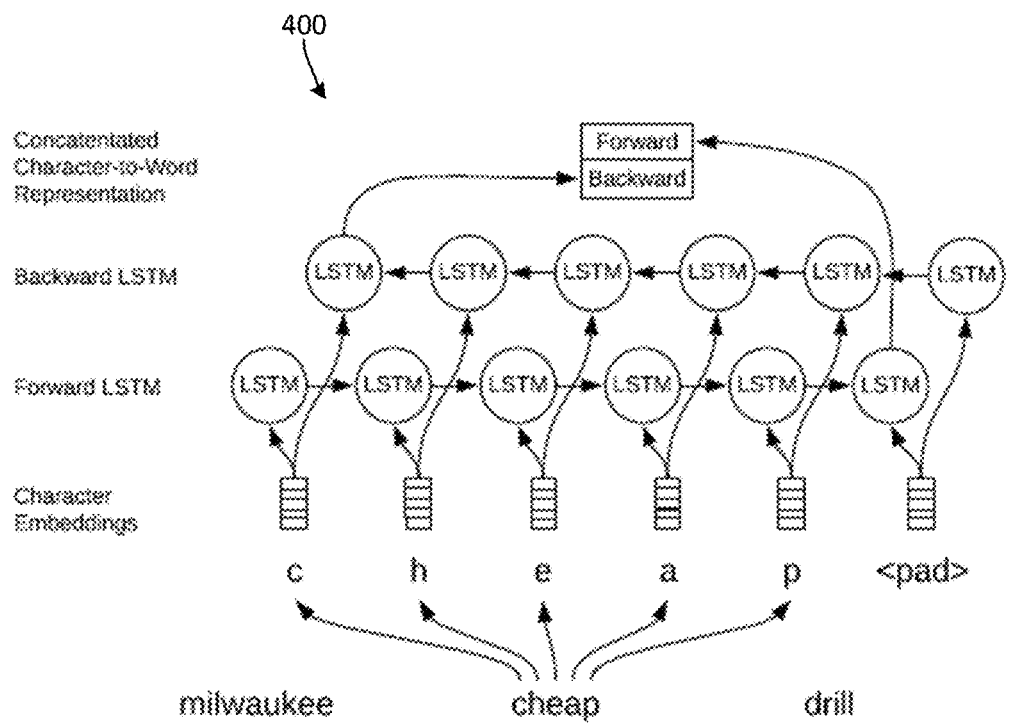
FIG. 4*a* is a diagrammatic view of an example character-to-word layer that may find use in the machine learning model trained and deployed in FIG. 3.

The machine learning algorithm may include one or more layers for character-based word representation. For character-based word embeddings, the algorithm may include a BiLSTM layer 400, as shown in FIG. 4a. The BiLSTM layer may extracts features from each word using a character-level model. The BiLSTM layer may be a character-to-word layer. The character-to-word layer may accept an unstructured query as input and may output one or more character-to-word representations of the words present in that query. As shown in FIG. 4a, the character-to-word layer may, as an intermediate step, calculate character embeddings respective of the characters in the query. Alternatively, the character-to-word layer may receive character embeddings as input.

Figure 4B:
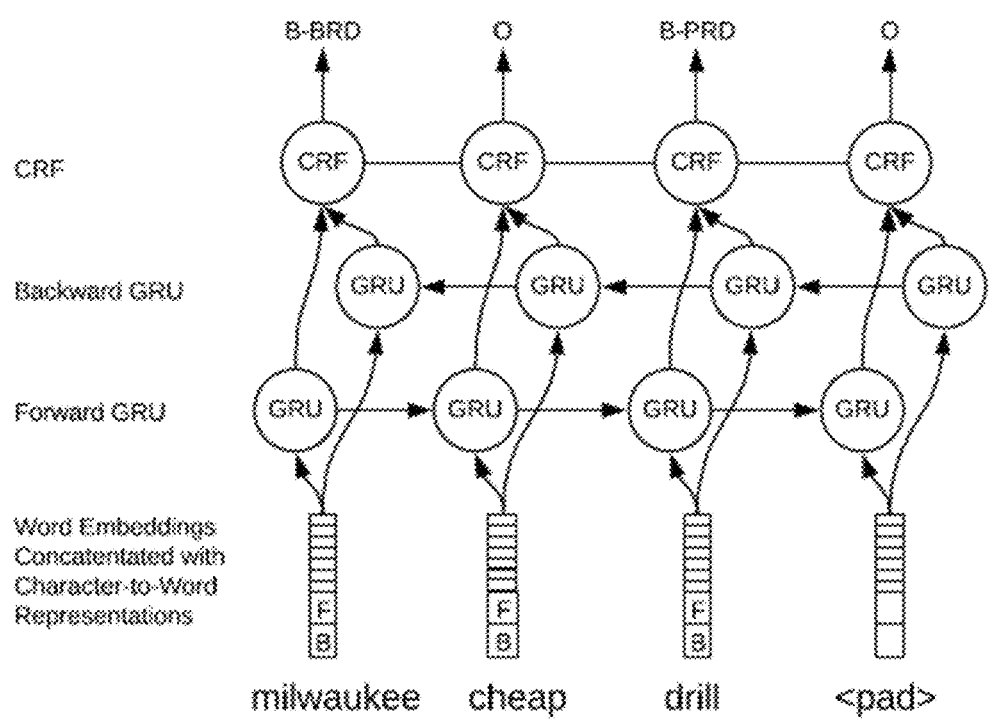
FIG. 4*b* is a diagrammatic view of an example word-to-label layer that may find use in the machine learning model trained and deployed in FIG. 3.

The machine learning algorithm may further include one or more layers for word-to-label representation. For example, as shown in FIG. 4b, the algorithm may include a BiGRU word-to-label layer 450. The word-to-label layer may receive one or more words (e.g., one or more words form a query, as output by a character-to-word layer) and may output one or more identifications of named entities. Such identifications may include, for example, a beginning of a named entity type, an inside of a named entity type, and a word that is outside of any named entity. For example, as shown in FIG. 4b, the word-to-label layer may output an indication of a named entity type of each input word. In the example of FIG. 4b, the word "milwaukee" is recognized as a beginning of the brand entity type (where B-BRD represents "Beginning-Brand"), "cheap" is recognized as outside ("O") of any named entity, and "drill" is recognized as a beginning of the product entity type ("B-PRD").

In some embodiments, as shown in FIG. 4b, the input to the word-to-label layer 450 may include the character-to-word representations that were output by the character-to-word layer 400, concatenated with word embeddings respective of the words of the query. Accordingly, defining the algorithm and executing the deployed model may include calculating the word embeddings respective of a query. For example, in some embodiments, Word2Vec or GloVe may be used to calculate word embeddings.

The word-to-label layer may include a CRF sub-layer, which may improve prediction of the most likely label sequence and may prevent invalid sequence transitions, such as B-BRD→I-PRD ("Inside Product") and O→I-BRD.

At block 326, the method 300 may include defining an initial training data set from the supplemented first data set 320. For example, a certain percentage of the data pairs of the supplemented first training data set 320 may be selected. In an embodiment, fifteen percent of the supplemented first training data set 320 is randomly selected as test data, and the rest of the supplemented first training data set 320 is randomly split into training (90% of remaining data) and validation data.

At block 328, the method 300 may include pre-processing the initial training data set. Pre-processing at block 328 may include, for example, balancing the named entity values in the initial training data set, such as by leveraging domain specific knowledge. For example, named entity values may be identified that can be either one named entity type or another (e.g., a brand or a product), such as cutter, instant pot, and anchor. At block 328, such queries may be balanced by oversampling entity types with fewer queries so that no bias is generated due to training data, in some embodiments. Oversampling may include creating new queries in the minority entity type to balance the type distribution in the training data for an imbalanced dataset. For example, for an entity value A that may represent either entity type Y or entity type Z, new queries may be created and added to the training data set to ensure that type Y and type Z have equal, or approximately equal, numbers of data points for value A in the training data.

The method 300 may further include, at block 330, training the machine learning algorithm according to the initial training data set (e.g., the pre-processed initial training data set). The algorithm may be trained at block 330 until the F1 score on the validation data set stops improving or until a predetermined number of epochs is reached.

The method may further include, at block 332, evaluating the trained model to determine if it has met some predetermined criterion or criteria, such as whether or not its F1 score has met a predetermined threshold. As noted above, a portion of the supplemented first training data may be used to evaluate the trained model.

If the trained model has not yet met the predetermined criteria, at block 334, the method 300 may include further stratified sampling (e.g., by named entity type pattern as described above) from the first test data set 314. At block 336, the trained model may be tested on the data pairs sampled at block 334. If, at block 336, the model's prediction on a query matches the named entities in the data pair, the data pair is added to the training data set 326 for the next training iteration. At block 338, the method 300 may include further stratified sampling from the second test data set 324. The data pairs sampled at block 338 may also be added to the training data set 326 for the next training iteration.

Phase III: Model Deployment. As noted above, the model training phase 304 may include training and evaluating multiple model types, in some embodiments. Accordingly, at block 342, the highest-performing model may be selected for deployment and, at block 344, the trained, final model may be packaged for deployment. For example, in an embodiment, the trained model may be packaged as a Tensorflow protobuf file with the required data (model weights, vocabulary, word embeddings, etc.). In some embodiments, the variables in a Tensorflow checkpoint may be converted into constants stored directly in the model graph, stripping out unreachable parts of the graph, folding constants, folding batch normalizations, removing training and debug operations, etc. At block 346, the method 300 may include deploying the final, trained model package may be deployed to a server such as, for example, a cloud virtual machine. At block 348, additional components associated with the trained model to enable its use in connection with a real-time search engine may be deployed, such as components for parsing a raw user search query and for converting a model prediction into machine readable form to use in search engine output. Blocks 350 and 352 illustrate an example input search query and example output of a real-time service employing the trained model, respectively.

FIG. 4 is a plot 400 illustrating example results (in the form of F1 scores) from three types of named entity recognition approaches. The first approach, shown with dash-dot line 402, is a greedy recognition approach. The second approach, shown with dashed line 404, is an approach according to the present disclosure, but using all training data in a single training, rather than an iterative training process in which further training data is added each iteration, as described above with respect to FIG. 3. Finally, the third approach, shown with diamond-dash line 406, is an approach according to the present disclosure with iterative training.

As shown in the plot 400, the advantage of an iterative training process is shown in three aspects. First, the F1 score improves from 87.1 at iteration 1 to 93.3 at iteration 7, which demonstrates that this process can iteratively improve the model. Second, compared to simply training the model once using all the data, this iterative process performs better in every iteration. Finally, compared to the greedy approach, an iteratively-trained model increases the F1 score from 69.5 to 93.3.

Named entity recognition according to the present disclosure offers many advantages over known approaches. First, instead of polishing one dataset to meet all requirements for training the machine learning algorithm, separate datasets may be prepared to meet different requirements. This separation of data sets results in simpler implementation and maintenance because each individual dataset can be prepared and improved independently and modularly. For example, if the set of possible named entity values increases, more synthetic data can be added and the model can be re-trained from scratch to recognize the new entity values. Second, instead of training the model in one-pass, iterative model training, with more training data added in each iteration, enables the model to learn more named entity type patters and cover more entity values by iteration.

Figure 5:
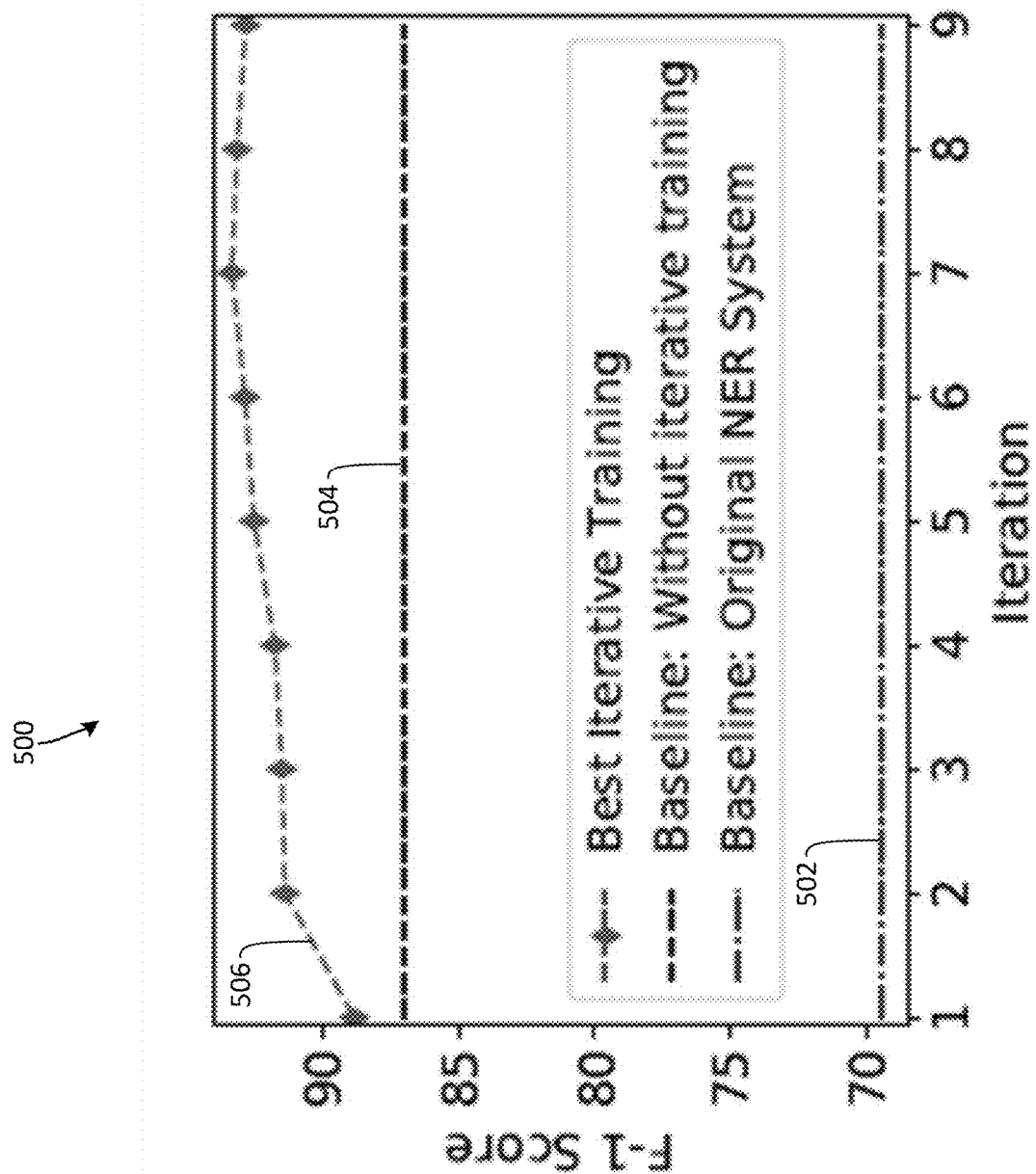
FIG. 5 is a plot illustrating accuracy (F1) scores of three different NER approaches.
Figure 6:
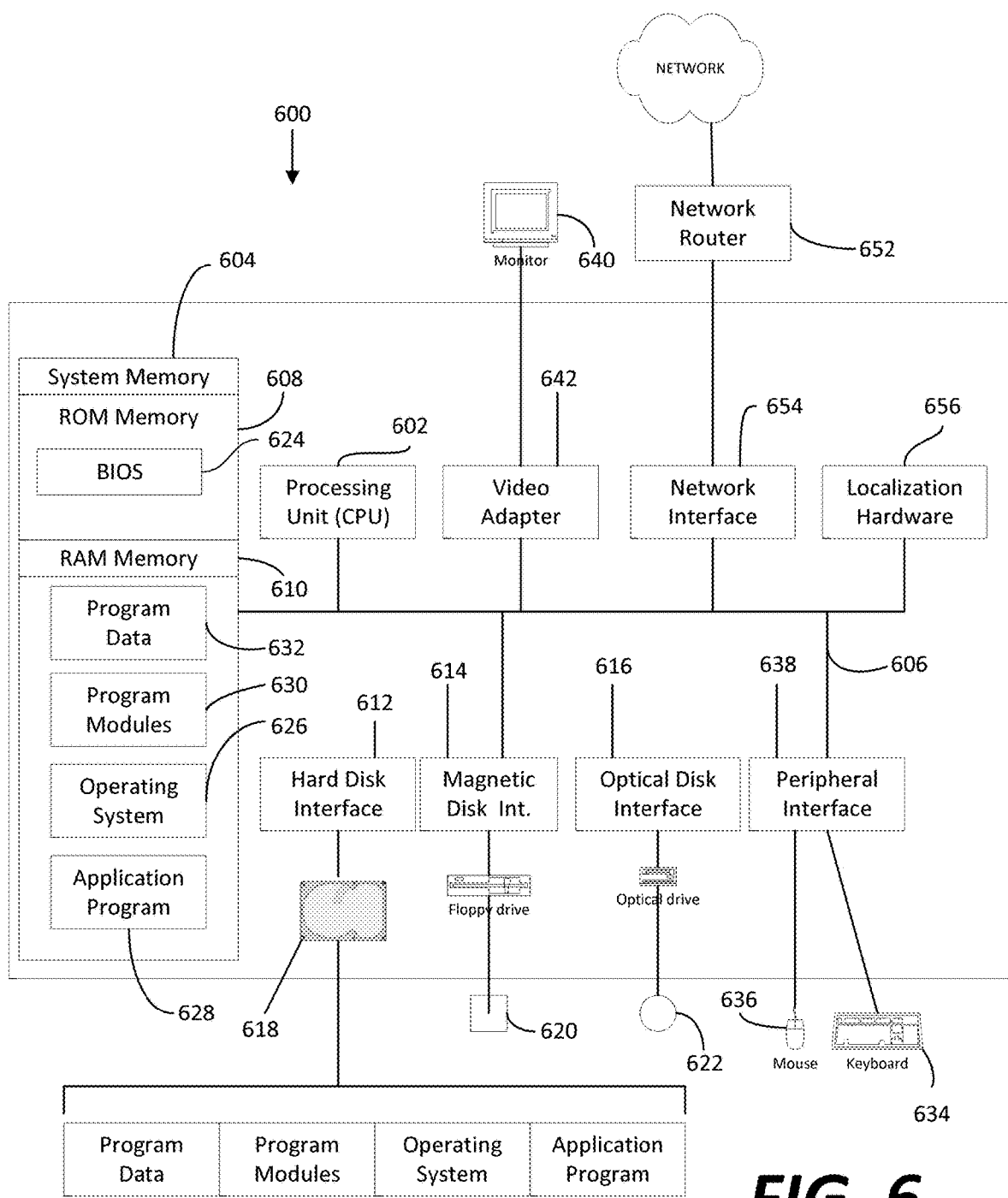
FIG. 6 is a diagrammatic view of an example embodiment of a user computing environment.

FIG. 5 is a diagrammatic view of an example embodiment of a user computing environment that includes a general purpose computing system environment 600, such as a desktop computer, laptop, smartphone, tablet, or any other such device having the ability to execute instructions, such as those stored within a non-transient, computer-readable medium. Furthermore, while described and illustrated in the context of a single computing system 600, those skilled in the art will also appreciate that the various tasks described hereinafter may be practiced in a distributed environment having multiple computing systems 600 linked via a local or wide-area network in which the executable instructions may be associated with and/or executed by one or more of multiple computing systems 600.

In its most basic configuration, computing system environment 600 typically includes at least one processing unit 602 and at least one memory 604, which may be linked via a bus 606. Depending on the exact configuration and type of computing system environment, memory 604 may be volatile (such as RAM 610), non-volatile (such as ROM 608, flash memory, etc.) or some combination of the two. Computing system environment 600 may have additional features and/or functionality. For example, computing system environment 600 may also include additional storage (removable and/or non-removable) including, but not limited to, magnetic or optical disks, tape drives and/or flash drives. Such additional memory devices may be made accessible to the computing system environment 600 by means of, for example, a hard disk drive interface 612, a magnetic disk drive interface 614, and/or an optical disk drive interface 616. As will be understood, these devices, which would be linked to the system bus 606, respectively, allow for reading from and writing to a hard disk 618, reading from or writing to a removable magnetic disk 620, and/or for reading from or writing to a removable optical disk 622, such as a CD/DVD ROM or other optical media. The drive interfaces and their associated computer-readable media allow for the nonvolatile storage of computer readable instructions, data structures, program modules and other data for the computing system environment 600. Those skilled in the art will further appreciate that other types of computer readable media that can store data may be used for this same purpose. Examples of such media devices include, but are not limited to, magnetic cassettes, flash memory cards, digital videodisks, Bernoulli cartridges, random access memories, nanodrives, memory sticks, other read/write and/or read-only memories and/or any other method or technology for storage of information such as computer readable instructions, data structures, program modules or other data. Any such computer storage media may be part of computing system environment 600.

A number of program modules may be stored in one or more of the memory/media devices. For example, a basic input/output system (BIOS) 624, containing the basic routines that help to transfer information between elements within the computing system environment 600, such as during start-up, may be stored in ROM 608. Similarly, RAM 610, hard drive 618, and/or peripheral memory devices may be used to store computer executable instructions comprising an operating system 626, one or more applications programs 628 (which may include the functionality of the search query processing system 106 of FIG. 1, for example), other program modules 630, and/or program data 622. Still further, computer-executable instructions may be downloaded to the computing environment 600 as needed, for example, via a network connection.

An end-user may enter commands and information into the computing system environment 600 through input devices such as a keyboard 634 and/or a pointing device 636. While not illustrated, other input devices may include a microphone, a joystick, a game pad, a scanner, etc. These and other input devices would typically be connected to the processing unit 602 by means of a peripheral interface 638 which, in turn, would be coupled to bus 606. Input devices may be directly or indirectly connected to processor 602 via interfaces such as, for example, a parallel port, game port, firewire, or a universal serial bus (USB). To view information from the computing system environment 600, a monitor 640 or other type of display device may also be connected to bus 606 via an interface, such as via video adapter 632. In addition to the monitor 640, the computing system environment 600 may also include other peripheral output devices, not shown, such as speakers and printers.

The computing system environment 600 may also utilize logical connections to one or more computing system environments. Communications between the computing system environment 600 and the remote computing system environment may be exchanged via a further processing device, such a network router 652, that is responsible for network routing. Communications with the network router 652 may be performed via a network interface component 654. Thus, within such a networked environment, e.g., the Internet, World Wide Web, LAN, or other like type of wired or wireless network, it will be appreciated that program modules depicted relative to the computing system environment 600, or portions thereof, may be stored in the memory storage device(s) of the computing system environment 600.

The computing system environment 600 may also include localization hardware 686 for determining a location of the computing system environment 600. In embodiments, the localization hardware 656 may include, for example only, a GPS antenna, an RFID chip or reader, a WiFi antenna, or other computing hardware that may be used to capture or transmit signals that may be used to determine the location of the computing system environment 600.

The computing environment 600, or portions thereof, may comprise one or more components of the system 100 of FIG. 1, in embodiments.

While this disclosure has described certain embodiments, it will be understood that the claims are not intended to be limited to these embodiments except as explicitly recited in the claims. On the contrary, the instant disclosure is intended to cover alternatives, modifications and equivalents, which may be included within the spirit and scope of the disclosure. Furthermore, in the detailed description of the present disclosure, numerous specific details are set forth in order to provide a thorough understanding of the disclosed embodiments. However, it will be obvious to one of ordinary skill in the art that systems and methods consistent with this disclosure may be practiced without these specific details. In other instances, well known methods, procedures, components, and circuits have not been described in detail as not to unnecessarily obscure various aspects of the present disclosure.

Some portions of the detailed descriptions of this disclosure have been presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic data capable of being stored, transferred, combined, compared, and otherwise manipulated in a computer system or similar electronic computing device. For reasons of convenience, and with reference to common usage, such data is referred to as bits, values, elements, symbols, characters, terms, numbers, or the like, with reference to various presently disclosed embodiments.

It should be borne in mind, however, that these terms are to be interpreted as referencing physical manipulations and quantities and are merely convenient labels that should be interpreted further in view of terms commonly used in the art. Unless specifically stated otherwise, as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers, or other such information storage, transmission, or display devices as described herein or otherwise understood to one of ordinary skill in the art.

What is claimed is:

1. A method for responding to a search query, the method comprising:

defining a machine learning algorithm to create a trained model, the machine learning algorithm configured to receive a user search query as input and to output zero or more named entities of one or more entity types in the user search query, each of the one or more entity types comprising a respective plurality of values;

receiving the user search query;

defining a first data set according to user behavior data, the first data set comprising a plurality of first data pairs, each data pair comprising the user search query and a one or more defined named entity values in the user search query;

defining a second data set by creating a plurality of artificial second data pairs, each second data pair comprising an artificial search query and one or more defined named entity values in the artificial search query;

recognizing one or more named entity values in the user search query based on the first data set and the second data set; and outputting a response to the user according to the one or more recognized named entity values, wherein the machine learning algorithm comprises:
a character-to-word layer comprising a bidirectional long short-term memory network, and
a word-to-label layer comprising a bidirectional gated recurrent unit network.

2. The method of claim 1, wherein outputting the response to the user according to the one or more recognized named entity values comprises:

directing a user associated with the user search query to a webpage dedicated to one of the one or more recognized named entity values;

filtering a set of search results according to the one or more recognized named entity values and outputting the filtered search result set to the user; or displaying the one or more recognized named entity values to the user.

3. The method of claim 1, the method further comprising:
training the machine learning algorithm to create the trained model by:
(i) defining an initial training data set comprising a portion of the first data set; and
(ii) training the algorithm according to the training data set.

4. The method of claim 3, wherein defining the initial training data set comprises:
determining one or more named entity values in the user search query of the first data set that are not in the associated defined named entity values of the first data set and the second data set;
adding the determined one or more named entity values to the defined named entity values of the first data set; and
evaluating the trained model according to a portion of the first data set that is not in the initial training data.

5. The method of claim 3, wherein training the machine learning algorithm further comprises:
(iii) adding further data from the first data set and the second data set to the training data set to create a further training data set;
(iv) training the algorithm according to the further training data set; and
(v) iteratively repeating (iii) and (iv).

6. The method of claim 5, wherein adding further data from the first data set and the second data set to the training data set comprises adding data pairs for each of a plurality of entity type sequences.

7. The method of claim 5, wherein iteratively repeating (iii) and (iv) comprises iteratively repeating (i) and (ii) until an accuracy of the trained model exceeds a predetermined threshold or until a predetermined number of iterations has been performed.

8. A system for responding to a search query, the system comprising:
a non-transitory, computer-readable memory storing instructions; and
a processor configured to execute the instructions to perform a method comprising:
defining a machine learning algorithm to create a trained model, the algorithm configured to receive a user query as input and to output zero or more named entities of one or more entity types in the user query, each of the one or more entity types comprising a respective plurality of values;
receiving a user search query;
defining a first data set according to user behavior data, the first data set comprising a plurality of first data pairs, each data pair comprising the user search query and a one or more defined named entity values in the user search query;
defining a second data set by creating a plurality of artificial second data pairs, each second data pair comprising an artificial search query and one or more defined named entity values in the artificial search query;
recognizing one or more named entity values in the search query with the trained model; and
outputting a response to the user according to the one or more recognized named entity values,
wherein the machine learning algorithm comprises:
a character-to-word layer comprising a bidirectional long short-term memory network, and
a word-to-label layer comprising a gated recurrent unit network.

9. The system of claim 8, wherein the method performed by the processor further comprises:
training the machine learning algorithm to create a trained model by:
a. defining an initial training data set comprising a portion of the first data set;
b. training the algorithm according to the training data set;
c. adding further data from the first data set and the second data set to the training data set to create a further training data set;
d. training the algorithm according to the further training data set; and
e. iteratively repeating (iii) and (iv); and
evaluating the trained model according to a portion of the first data set that is not in the initial training data.

10. The system of claim 9, wherein defining the initial training data set comprises:
determining a plurality of named entity values in the user search queries of the first data set that are not in the associated defined named entity values of the first data set and the portion of the second data set; and
adding the determined plurality of named entity values to the defined named entity values of the first data set.

11. The system of claim 9, wherein adding further data from the first data set and the second data set to the training data set comprises adding data pairs for each of a plurality of entity type sequences.

12. The system of claim 9, wherein iteratively repeating (iii) and (iv) comprises iteratively repeating (i) and (ii) until an accuracy of the trained model exceeds a predetermined threshold or until a predetermined number of iterations has been performed.

13. The system of claim 8, wherein outputting a response to the user according to the one or more recognized named entity values comprises:
   directing a user associated with the user search query to a webpage dedicated to one of the one or more recognized named entity values;
   filtering a set of search results according to the one or more recognized named entity values and outputting the filtered search result set to the user; or
   displaying the one or more recognized named entity values to the user.

14. A method for training a machine learning algorithm to create a trained model for recognizing one or more named entities in a user search query, the one or more named entities having one or more entity types, the method comprising:
   receiving the user search query;
   defining a first data set according to user behavior data, the first data set comprising a plurality of first data pairs, each first data pair comprising the user search query and one or more defined named entity values in the user search query;
   determining a plurality of named entity values in the user search queries of the first data set that are not in the associated defined named entity values of the first data set;
   adding the determined plurality of named entity values to the defined named entity values of the first data set to create a supplemented first data set;
   defining a second data set by creating a plurality of artificial second data pairs, each second data pair comprising an artificial search query and one or more defined named entity values in the artificial search query; and
   training the machine learning algorithm to create the trained model based on the supplemented first data set, wherein the machine learning algorithm comprises:
      a character-to-word layer comprising a bidirectional long short-term memory network, and
      a word-to-label layer comprising a gated recurrent unit network.

15. The method of claim 14, wherein training the machine learning algorithm to create the trained model based on the supplemented first training data set further comprises:
   a. defining an initial training data set comprising a portion of the supplemented first data set;
   b. training the algorithm according to the training data set;
   c. adding further data from the supplemented first data set and from the second data set to the initial training data set to create a further training data set;
   d. training the algorithm according to the further training data set; and
   e. iteratively repeating (iii) and (iv) until an accuracy of the trained model exceeds a predetermined threshold or until a predetermined number of iterations has been performed.

16. The method of claim 15, wherein adding further data from the first data set and the second data set to the training data set comprises adding data pairs for each of a plurality of entity type sequences.

17. The method of claim 15, further comprising evaluating the trained model according to a portion of the first data set that is not in the initial training data.

* * * * *